(12) United States Patent
Russo et al.

(10) Patent No.: US 8,860,586 B2
(45) Date of Patent: Oct. 14, 2014

(54) TEST ARRANGEMENT FOR A LASER THREATS IDENTIFYING SYSTEM OF AN AIRCRAFT

(75) Inventors: Francesco Russo, Turin (IT); Alessandro Barletta, Turin (IT)

(73) Assignee: Aleni Aeronautica S.p.A., Pomigliano d'arco (Napoli) (IT)

( * ) Notice: Subject to any disclaimer, the term of this patent is extended or adjusted under 35 U.S.C. 154(b) by 459 days.

(21) Appl. No.: 13/063,089

(22) PCT Filed: Sep. 8, 2009

(86) PCT No.: PCT/IB2009/053917
§ 371 (c)(1),
(2), (4) Date: Mar. 9, 2011

(87) PCT Pub. No.: WO2010/029499
PCT Pub. Date: Mar. 18, 2010

(65) Prior Publication Data
US 2011/0163897 A1    Jul. 7, 2011

(30) Foreign Application Priority Data
Sep. 9, 2008 (IT) .................................. TO08A0661

(51) Int. Cl.
G08B 21/00 (2006.01)
G01S 7/495 (2006.01)
G01S 7/497 (2006.01)
F41H 11/02 (2006.01)
G01S 7/481 (2006.01)

(52) U.S. Cl.
CPC ................. G01S 7/495 (2013.01); G01S 7/497 (2013.01); F41H 11/02 (2013.01); G01S 7/4818 (2013.01)
USPC ........... 340/945; 340/961; 702/182; 702/183; 250/206.1

(58) Field of Classification Search
None
See application file for complete search history.

(56) References Cited

U.S. PATENT DOCUMENTS 5,047,782 A * 9/1991 Lew et al. ..................... 342/169
5,206,500 A    4/1993 Decker et al.
6,785,032 B1   8/2004 Le Mere
(Continued)

FOREIGN PATENT DOCUMENTS

WO    WO-99/06852 A1    2/1999

OTHER PUBLICATIONS

International Search Report and Written Opinion issued in PCT/IB2009/053917 dated Jan. 13, 2010.

*Primary Examiner* — Mohammad Ghayour
*Assistant Examiner* — Adnan Aziz
(74) *Attorney, Agent, or Firm* — Venable LLP; Robert Kinberg; Robert S. Babayi

(57) ABSTRACT

A test arrangement for a laser threats identifying system of an aircraft comprises optical detecting means (10), adapted to pick up threat light beams (B) impinging on the aircraft (12) from a plurality of surrounding space sectors, and a threat warning unit (30), adapted to receive a plurality of actual optical signals indicative of at least one of the threat beams (B) through a plurality of optical channels (20), and arranged for comparing the actual signals with a predetermined library of reference optical signals representing known threats. The test arrangement includes a light emitting source (L) arranged for selectively generating a plurality of predetermined optical signals for simulating virtual threats (S1-Sn), and a plurality of optical guides (F1-Fn) for the simulation signals (S1-Sn), directly coupled with the source (L) and adapted to be connected to the aforementioned optical channels (20_120_n) for selectively stimulating the threat warning unit (30).

5 Claims, 2 Drawing Sheets

(56) References Cited

U.S. PATENT DOCUMENTS

| | | | |
|---|---|---|---|
| 7,297,913 B2* | 11/2007 | Tholl et al. | 250/206.1 |
| 7,521,664 B2* | 4/2009 | David | 250/221 |
| 7,920,255 B2* | 4/2011 | Aphek et al. | 356/139.04 |
| 2002/0154857 A1* | 10/2002 | Goodman et al. | 385/24 |
| 2008/0169423 A1* | 7/2008 | Betschart et al. | 250/372 |
| 2009/0254307 A1* | 10/2009 | Deriso et al. | 702/182 |

* cited by examiner

FIG. 1
FIG. 2
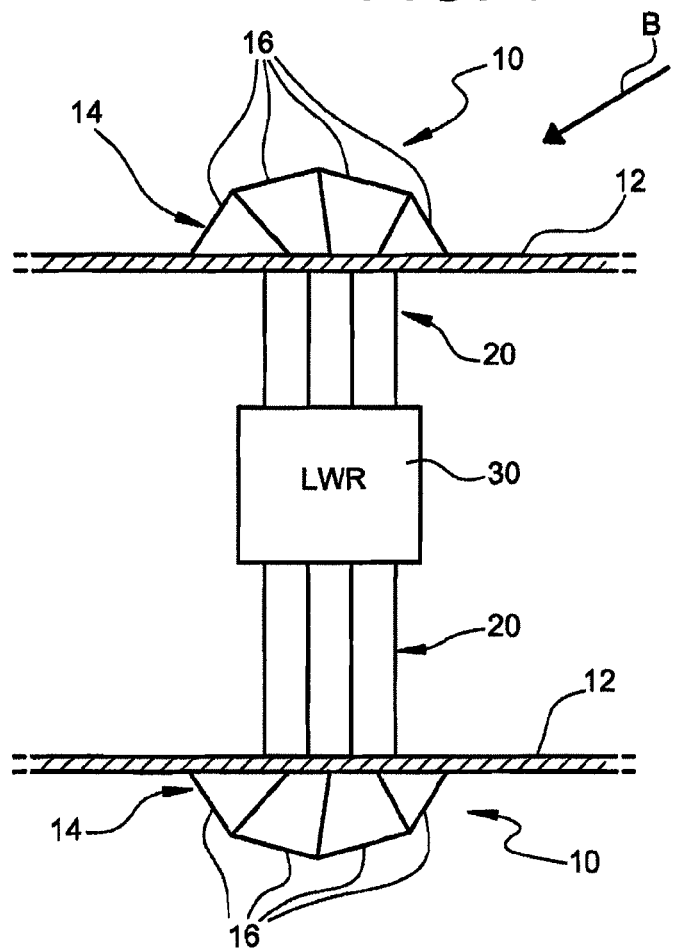
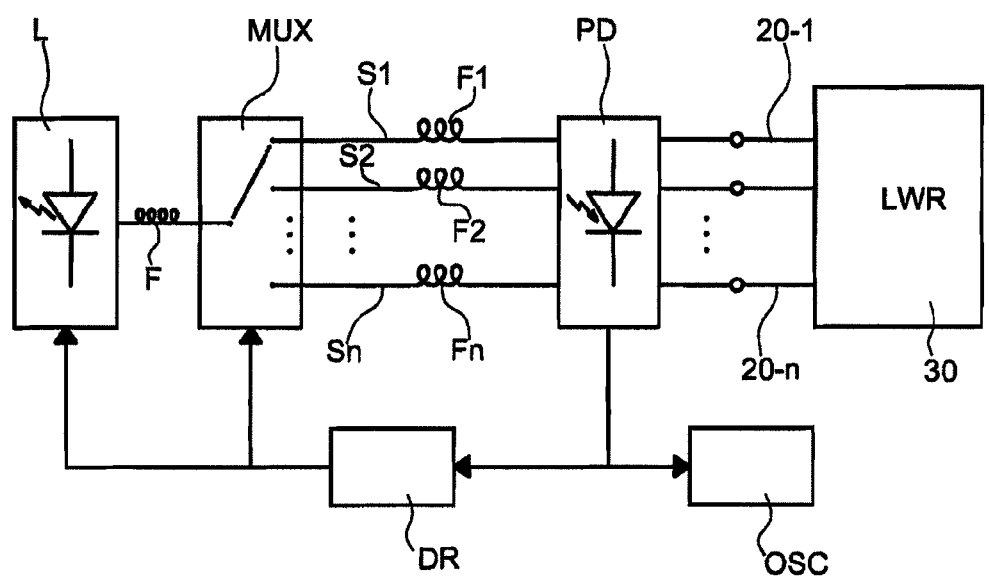

TEST ARRANGEMENT FOR A LASER THREATS IDENTIFYING SYSTEM OF AN AIRCRAFT

BACKGROUND

The present invention concerns laser threats identifying systems of aircrafts, and specifically a test arrangement for a system for identifying light beams impinging on an aircraft.

In avionics, to detect or track an aircraft, targeting light beams are used, generally emitted by collimated laser sources, adapted to illuminate a target and possibly to provide an aid to interfere with it.

For example, a "range finder" laser beam having the characteristics of low repetition frequency (a few kHz) and a very narrow pulse amplitude (of the order of a few ns) is used to measure the distance of a targeted object; a "designator" laser beam having the characteristics of a continuous wave with a high repetition over-modulation frequency (up to 500 kHz) and high power is used by weapon systems for targeting an object (identification and tracking); a laser beam having the characteristics of medium repetition frequency (tens of kHz) is used to illuminate a target and to direct a missile or similar laser guided weapon ("beam rider") on it, adapted to dynamically track a predetermined targeting signal on its trajectory.

For this reason the aircrafts are equipped with on board identification systems, adapted to detect possible impinging light signals and to identify the threat posed by them, as well as the direction they come from, analysing the characteristics of the light signal and comparing them with a library of known signals, which is constantly updated.

A typical identification system is schematically shown in FIG. 1. It comprises at least one and preferably two detecting devices 10 exposed on the fairing of the aircraft 12, for example mounted symmetrically on opposite sides of the fuselage and adapted to cover all the observation directions in space. Each detector includes a faceted optical head 14 comprising a plurality of optical windows (mirrors) 16 adapted to collect one or more targeting light beams B coming from the sectors of space towards which they are oriented.

The optical signals conveyed by the collected light beams, referring to each controlled sector of space, are forwarded, through a corresponding plurality of optical channels 20, (light guides or plastic fibres) to a processing and signalling unit (Laser Warning Receiver, LWR) 30. This is provided with integrated optical sensors and adapted to analyse the characteristics of the intercepted optical signal (power and waveform of the modulating signal) and compare them with a library of known signals, keeping track of the contributions that a single incident light beam can bring simultaneously on many mirrors.

The correct detection of a threat posed by a laser beam which tracks the aircraft allows suitable countermeasures to be taken, be they a diversion flight manoeuvre, an attempt to destroy the apparatus posing the threat or the actuation of the systems for saving the pilot or the crew of the aircraft.

The system thus conceived must be tested in view of its first installation on board of an aircraft and the test arrangement can also be used with the purpose of validating the libraries the system is provided with (this is a conventional operational support function, since the libraries can vary from one mission to the next, according to the operational scenario), verifying the correct application of the priorities for identifying threats and monitoring the response speed.

The testing and the validation are based upon the generation and representation of virtual threat scenarios, adapted to replicate possible actual known threats as faithfully as possible, and the consequent verification of the response provided by the identifying system.

Currently, used test arrangements include a plurality of high power light beam generators (laser generators in free-space), arranged in different space sectors around a detection device to be illuminated, and controlled to generate optical signals at the desired wavelengths (infrared (NIR), visible) and having known form characteristics, indicative of a possible threat.

Disadvantageously, this arrangement has critical points in terms of safety and reliability. Indeed, laser generators must be shielded from one another and with respect to the environment outside the testing site. The light beams must also be correctly collimated in the air, through lenses or beam expanders, so as to replicate the propagation conditions with a widening in the atmosphere of a typical actual beam which can hit the detection device, possibly on many adjacent mirrors, and this is an operation that requires complex mechanical aligning of the laser generators.

SUMMARY

The present invention has the purpose of providing a test arrangement for a laser threats identifying system which avoids the drawbacks of the prior art and allows a plurality of virtual threat scenarios to be reliably represented.

According to the present invention such a purpose is obtained thanks to a test arrangement having the characteristics outlined in claim 1.

Particular embodiments form the subject of the dependent claims, the content of which should be intended as an integral or integrating part of the present description.

In short, the present invention is based upon the principle of providing low power virtual threat optical signals directly to an LWR processing and signalling unit, downstream of a light beam detecting device, and in a guided manner without any propagation of optical beams in free air. In practice, this is carried out through the generation of optical signals for simulating laser threats through a low power laser source which can be modulated and tuned electronically, and their direct injection in optical fibres feeding the LWR unit.

Advantageously, the lower emission power and the greater efficiency of laser devices coupled to fibres allow a laboratory test arrangement to be fabricated using more cost-effective components, and the guided propagation allows the desired collimation of the signals to be ensured, excluding any safety problem caused by spurious and unchecked emissions of high power light beams.

The possibility of precisely controlling through software the optical signals provided to the LWR unit, in the characteristic wave form and wavelength range (pulse trains with predetermined repetition frequency and pulse width) respectively, allows the testing procedure to be carried out more easily, maintaining however the simulating precision of a conventional arrangement, with respect to which it is nevertheless possible to be freed from the influence of the mechanical constraints of the various components.

Advantageously, the test arrangement according to the invention allows additional simulation functions to be obtained with respect to typical ones of a conventional arrangement, such as the simulation of faults and defects on a detection channel, for example caused by degradation (steaming up) of a mirror of a detection device, or the simulation of variable power losses of the incident signals due to the propagation in the atmosphere or to insertion losses that the identifying system may have in case of a malfunctioning or an imperfect coupling between the light guides 20 and the windows 16 or the processing and signalling unit 30.

BRIEF DESCRIPTION OF DRAWINGS

Further characteristics and advantages of the invention shall be outlined in more detail in the following detailed description of one embodiment, given by way of non-limitative example, with reference to the attached drawings, in which:

FIG. 1 is a schematic representation of a system for identifying laser threats of an aircraft;

FIG. 2 is a circuit diagram of a test arrangement of a system for identifying laser threats according to the invention.

DETAILED DESCRIPTION

Figure 3:
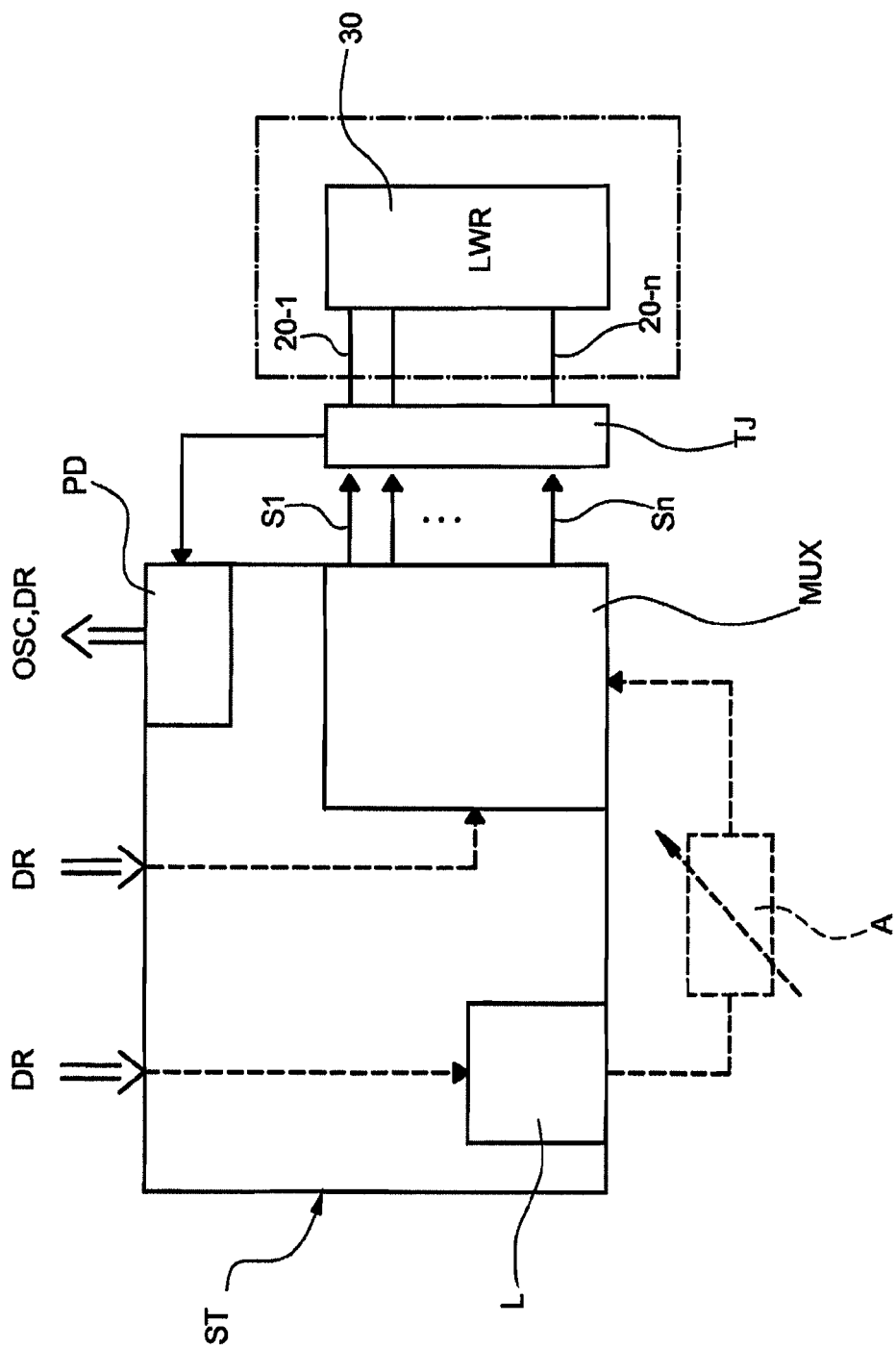
FIG. 3 is a functional block diagram of the test arrangement of FIG. 2.

A conventional system for identifying laser threats of an aircraft is illustrated in FIG. 1 and it has been concisely described in the introductory part of this description. Since it is known to a man skilled in the art, it shall not be mentioned further in greater detail.

The circuit diagram of a test arrangement of the system of FIG. 1 being the subject of the invention is shown in FIG. 2.

An optical signal emitting device, preferably a laser device emitting collimated, coherent light, at an operative wavelength within the range of the near infrared, is indicated with L. It is adapted to emit a plurality of optical signals S1-Sn for stimulating a LWR system 30 for identifying threats, each having a controlled waveform, indicative of a predetermined threat light beam.

The emitting device L is coupled with a switch or optical multiplexer MUX through a section of optical fibre F directly coupled at the output of the device L with a minimization of the insertion losses. The optical multiplexer MUX is adapted to switch the optical signals emitted by the device L between a plurality of optical paths, in a number corresponding to the number of optical channels of the identifying system, i.e., the number of optical signals treated by the processing and signalling LWR unit 30, each comprising a respective section of optical fibre F1-Fn.

Alternatively, it is possible to foresee the use of a plurality of emitting devices, each associated with a respective optical fibre, thus doing without the optical multiplexer.

At the end of the sections of fibres F1-Fn a photo detector device or similar optical-electric transducer PD can advantageously be connected, which is adapted to detect the optical signal S1-Sn output from each channel and make such information available in feedback to a processing module DR for driving the emitting device L and controlling the optical multiplexer MUX, or possibly to an oscilloscope OSC to display the parameters of the waveform of the signal S1-Sn input to the LWR identifying system 30 under test.

The terminals of the fibre sections F1-Fn are equipped with fibre junction members, for the matched optical and mechanical coupling, optimized with respect to the possible insertion losses, with the light guides 20-1, 20-n which conventionally equip the processing and signalling LWR unit 30 under test.

FIG. 3 shows a functional block diagram of the test arrangement of FIG. 2 in detail.

An assembly of the test arrangement of the LWR system 30 for identifying threats is indicated with ST and comprises the emitting device L as a stimulation source, adapted to generate the simulation optical signals S1-Sn necessary for stimulating the optical sensors of the processing and signalling LWR unit. For the purposes of the invention a semiconductor laser device is preferred, which can be directly modulated and tuned over a plurality of wavelengths.

The test arrangement ST is driven by a driving circuit DR adapted to modulate the power output from the source L and to control the waveform of the optical stimulation signals, i.e., the respective pulse width and repetition frequency of the pulses, in view of the correct stimulation of the LWR unit. Preferably, the pulse width is between 5 and 500 ns and its repetition frequency is between a single pulse per period (or even, a continuous signal) and a pulse train at 50 kHz.

The laser emitting device L is preferably selected to emit a wavelength within the range 800-1600 nm, ensuring a level of maximum optical power output which is greater than 15 mW on each of the output channels, for every specified waveform.

It is foreseen the possibility to insert an external attenuator (indicated with A in the figure in a broken line) having a controlled variable attenuation, for example adjustable with continuity in the range between 0 and 60 dB, between the modulable source L and the switch MUX along the section of optical fibre F to add an extra-attenuation, if necessary.

Through the driving circuit DR also the routing of the optical stimulation signals, generated by the emitting device L, on the optical channels 20-1, 20-n of the signalling LWR unit 30, is controlled, by means of the switch MUX. In particular, the switch MUX can be driven manually, through suitable buttons, or automatically, for example, through a serial interface RS-232 or IEEE 4888-GPIB, ensuring switching between the channels in a time shorter than 100 ms.

A fibre strap or branching junction TJ, connected at the end of the fibre sections F1-Fn is arranged for allowing the stimulation signal S1-Sn to be extracted and routed in feedback towards the photo-detector device PD to calibrate the contribution of the single signals S1-Sn of the optical paths 20-1, 20-n. Specifically, the feedback closed on the modulating circuit of the emitting device L is adapted to modify the optical power output in a controlled way and to possibly carry out a threshold test to simulate both the power losses due to the propagation in the atmosphere and the possible insertion losses of the identifying system in case of malfunction. The feedback closed on the control circuit of the switch MUX is adapted to selectively exclude one or more paths, for example, in the simulation of fault conditions at an optical channel.

It should be noticed that the embodiment proposed for the present invention in the aforementioned description has purely the function of being a non limiting example of the present invention. In the current preferred embodiment the test arrangement ST has 8 output gates, able to be selected and univocally addressed, since a minimum configuration of the system for identifying threats includes 8 parallel optical channels, each referring to a respective space sector of surveillance.

A man skilled in the art can easily carry out the present invention in different embodiments which do not depart however, from the principles outlined hereby, and are thus covered in the present patent. This particularly applies with regard to the possibility of making the test arrangement in modular form, whereby what has been described constitutes a minimum module, and it is possible to position a plurality of testing arrangements side by side to obtain the stimulation of a threats identifying system equipped with a signalling LWR unit having many inputs.

Of course, without affecting the principle of the invention, the embodiments and the constructive details can be widely varied with respect to what has been described and illustrated purely by way of non-limitative example, without thereby departing from the scope of protection of the invention defined by the attached claims.

The invention claimed is:

1. A test arrangement for a laser threats identifying system of an aircraft, comprising:
   an optical detector, adapted to pick up threat light beams impinging on the aircraft from a plurality of surrounding space sectors;
   a threat warning unit, adapted to receive a plurality of actual optical signals indicative of at least one of said threat beams through a plurality of optical channels related to respective beam incidence directions, and arranged for comparing said actual signals with a predetermined library of reference optical signals representing known threats;
   a light emitting device arranged for selectively generating a plurality of predetermined optical signals for simulating virtual threats;
   a plurality of optical guides for said simulation signals, directly coupled to said light emitting device and adapted to be connected to said plurality of optical channels for selectively stimulating the threat warning unit; one light emitting source and a switching circuit for selectively routing the simulation signals generated by said source into one of said plurality of optical guides; and
   a photo-detecting device selectively arranged at the output of said optical guides, adapted to intercept the generated optical simulation signals arranged for providing feedback signals to a driving circuit for providing power to the light emitting device and controlling the switching circuit.

2. The test arrangement according to claim 1, wherein said light emitting source is a controllable laser source, adapted to generate optical simulation signals comprising a pulse train with a frequency between 0 and 50 kHz.

3. The test arrangement according to claim 2, wherein said laser source is tunable in a wavelength range between 800 and 1600 nm.

4. The test arrangement according to claim 1, comprising a power attenuator arranged at the output of said light emitting source.

5. The test arrangement according to claim 1, wherein said photo-detecting device is arranged for providing to a display, electrical signals representative of said simulation signals.

* * * * *

UNITED STATES PATENT AND TRADEMARK OFFICE
CERTIFICATE OF CORRECTION

PATENT NO. : 8,860,586 B2  Page 1 of 1
APPLICATION NO. : 13/063089
DATED : October 14, 2014
INVENTOR(S) : Russo et al.

It is certified that error appears in the above-identified patent and that said Letters Patent is hereby corrected as shown below:

Title Page, Item 73, "Aleni Aeronautica S.p.A.," should be --Alenia Aeronautica S.p.A.--.

Signed and Sealed this
Twelfth Day of July, 2016

Michelle K. Lee
*Director of the United States Patent and Trademark Office*